US012712347B2

(12) United States Patent
Daidoji et al.

(10) Patent No.: US 12,712,347 B2
(45) Date of Patent: Aug. 18, 2026

(54) ELECTRICAL JUNCTION BOX

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Tatsuya Daidoji, Yokkaichi (JP); Arinobu Nakamura, Yokkaichi (JP); Heng Cao, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 169 days.

(21) Appl. No.: 18/570,148

(22) PCT Filed: Jun. 1, 2022

(86) PCT No.: PCT/JP2022/022322

§ 371 (c)(1),
(2) Date: Dec. 14, 2023

(87) PCT Pub. No.: WO2022/264814

PCT Pub. Date: Dec. 22, 2022

(65) Prior Publication Data

US 2025/0096541 A1 Mar. 20, 2025

(30) Foreign Application Priority Data

Jun. 18, 2021 (JP) ................................ 2021-101592

(51) Int. Cl.
*H02G 3/08* (2006.01)
*H02G 3/16* (2006.01)

(52) U.S. Cl.
CPC .............. *H02G 3/088* (2013.01); *H02G 3/16* (2013.01)

(58) Field of Classification Search
CPC . H02G 3/08; H02G 3/088; H02G 3/16; B60R 16/02; H05K 5/02; H05K 7/06
USPC .......................................................... 174/50
See application file for complete search history.

(56) References Cited

FOREIGN PATENT DOCUMENTS

JP 2003-284218 A 10/2003
JP 2012-028075 A 2/2012

OTHER PUBLICATIONS

International Search Report, Application No. PCT/JP2022/022322, mailed Aug. 2, 2022. ISA/Japan Patenet Office.

*Primary Examiner* — Tremesha W Burns
(74) *Attorney, Agent, or Firm* — Brooks Kushman P.C.

(57) ABSTRACT

An electrical junction box includes a busbar, a molded resin portion that is insert-molded using the busbar as an insert component, a case that covers the molded resin portion to form a waterproof space, a blocking portion that blocks a first opening of a through hole passing through the molded resin portion, and a waterproofing resin that is filled in the through hole. The through hole is formed between the first holding portion and the second holding portion and the entire periphery of an intermediate portion of the busbar is exposed in the through hole. The blocking portion is a member that is provided separately from the molded resin portion. The waterproofing resin reaches the blocking portion while entirely covering the periphery of the intermediate portion of the busbar.

8 Claims, 9 Drawing Sheets

ELECTRICAL JUNCTION BOX

CROSS-REFERENCE TO RELATED APPLICATIONS

This application is the U.S. national stage of PCT/JP2022/022322 filed on Jun. 1, 2022, which claims priority of Japanese Patent Application No. JP 2021-101592 filed on Jun. 18, 2021, the contents of which are incorporated herein.

TECHNICAL FIELD

The present disclosure relates to an electrical junction box.

BACKGROUND

JP 2003-284218A discloses a waterproof structure of a circuit assembly that includes a busbar and a housing insert-molded using the busbar as an insert component. The housing is provided with a through hole. The entire periphery of an intermediate portion of the busbar is exposed in the space inside the through hole. Infiltration of water into a waterproof space through the gap between the busbar and the housing is inhibited by filling the through hole with a waterproofing adhesive.

The waterproofing adhesive is filled in the through hole in a flowable state, and is then cured into a nonflowable state. It is desired that the waterproofing adhesive reliably stays in the through hole during this period.

Therefore, an object is to provide a technology with which a waterproofing resin filled in a through hole in a flowable state can reliably stay in the through hole until the waterproofing resin is cured into a nonflowable state.

SUMMARY

An electrical junction box of the present disclosure incudes: a busbar; a molded resin portion that is insert-molded using the busbar as an insert component; a case that covers the molded resin portion to form a waterproof space; a blocking portion that blocks a first opening out of a first opening and a second opening of a through hole passing through the molded resin portion; and a waterproofing resin that is filled in the through hole, wherein the molded resin portion includes a first holding portion that holds one end portion of the busbar, and a second holding portion that holds the busbar with the other end portion of the busbar being exposed in the waterproof space, the through hole is formed between the first holding portion and the second holding portion and an entire periphery of an intermediate portion of the busbar is exposed in the through hole, the blocking portion is a member that is provided separately from the molded resin portion, and the waterproofing resin reaches the blocking portion while entirely covering the periphery of the intermediate portion of the busbar.

ADVANTAGEOUS EFFECTS

With the present disclosure, a waterproofing resin filled in a through hole in a flowable state can reliably stay in the through hole until the waterproofing resin is cured into a nonflowable state.

DETAILED DESCRIPTION OF PREFERRED EMBODIMENTS

Figure 1:
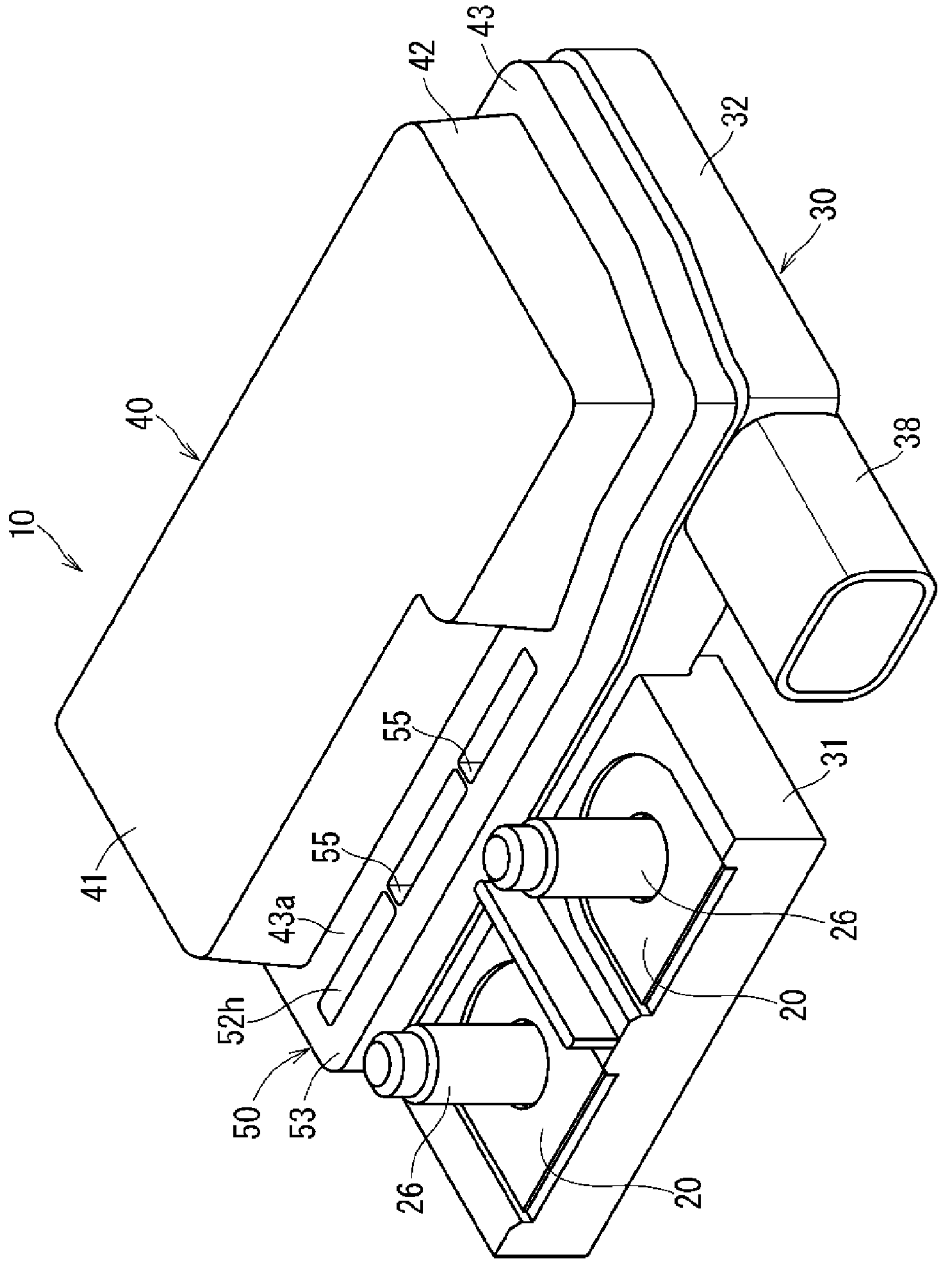
FIG. 1 is a perspective view showing an electrical junction box according to Embodiment 1.

First, aspects of the present disclosure will be listed and described.

An electrical junction box of the present disclosure is as follows.

In a first aspect, an electrical junction box incudes: a busbar; a molded resin portion that is insert-molded using the busbar as an insert component; a case that covers the molded resin portion to form a waterproof space; a blocking portion that blocks a first opening out of a first opening and a second opening of a through hole passing through the molded resin portion; and a waterproofing resin that is filled in the through hole, wherein the molded resin portion includes a first holding portion that holds one end portion of the busbar, and a second holding portion that holds the busbar with the other end portion of the busbar being exposed in the waterproof space, the through hole is formed between the first holding portion and the second holding portion and an entire periphery of an intermediate portion of the busbar is exposed in the through hole, the blocking portion is a member that is provided separately from the molded resin portion, and the waterproofing resin reaches the blocking portion while entirely covering the periphery of the intermediate portion of the busbar. A portion corresponding to the through hole has a bottomed hole shape in which the second opening is open and the bottom is formed by the blocking portion due to the first opening of the through hole being blocked by the blocking portion. With this configuration, the waterproofing resin filled in the through hole through the second opening in a flowable state can reliably stay in the through hole until the waterproofing resin is cured into a nonflowable state.

In a second aspect, in the electrical junction box according to the first aspect, the blocking portion may be formed in one piece with the case. With this configuration, an increase in the number of components can be suppressed compared with the case where the blocking portion is provided as a member separate from the case.

In a third aspect, in the electrical junction box according to the first aspect or the second aspect, the blocking portion may be welded to a peripheral edge portion of the through hole in the molded resin portion. With this configuration, the gap between the blocking portion and the molded resin portion is blocked by the welded portion, thus inhibiting the waterproofing resin in a flowable state from leaking through the gap between the blocking portion and the molded resin portion.

In a fourth aspect, in the electrical junction box according to any one of the first through the third aspects, one of the blocking portion and a peripheral edge portion of the through hole in the molded resin portion may be provided with an annular groove and the other may be provided with an annular protrusion fitted to the groove. With this configuration, the waterproofing resin in a flowable state is unlikely to leak to the outside even when entering the gap between the blocking portion and the molded resin portion.

In a fifth aspect, in the electrical junction box according to any one of the first through the fourth aspects, a portion of the blocking portion that serves as a bottom of the through hole may enter the through hole. With this configuration, the amount of usage of the waterproofing resin can be reduced.

The following describes specific embodiments of an electrical junction box of the present disclosure with reference to the drawings. Note that the present disclosure is not limited to these embodiments and is defined by the scope of the appended claims, and all changes that fall within the same essential spirit as the scope of the claims are intended to be included therein.

Embodiment 1

Figure 2:
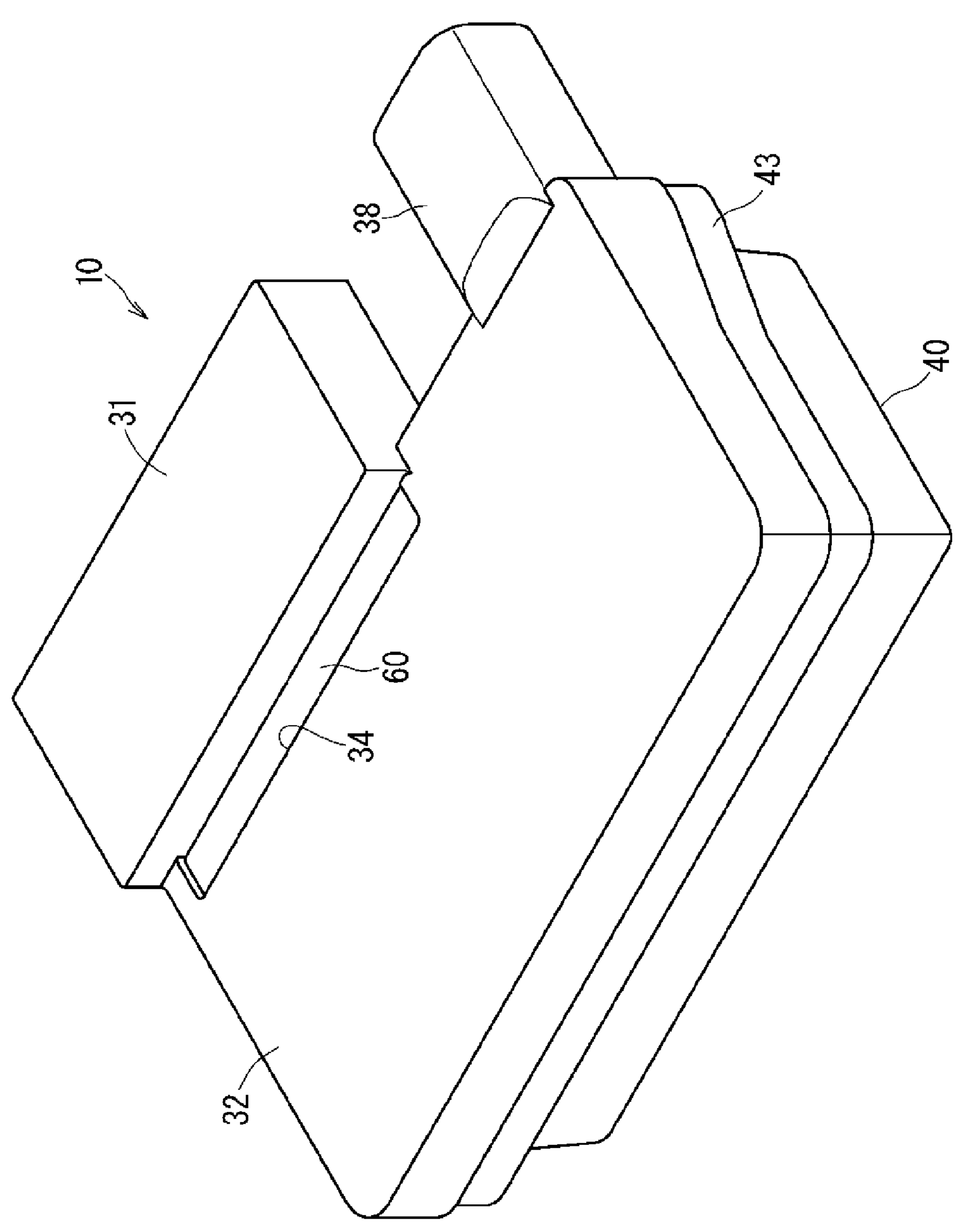
FIG. 2 is a perspective view showing the electrical junction box according to Embodiment 1.
Figure 3:
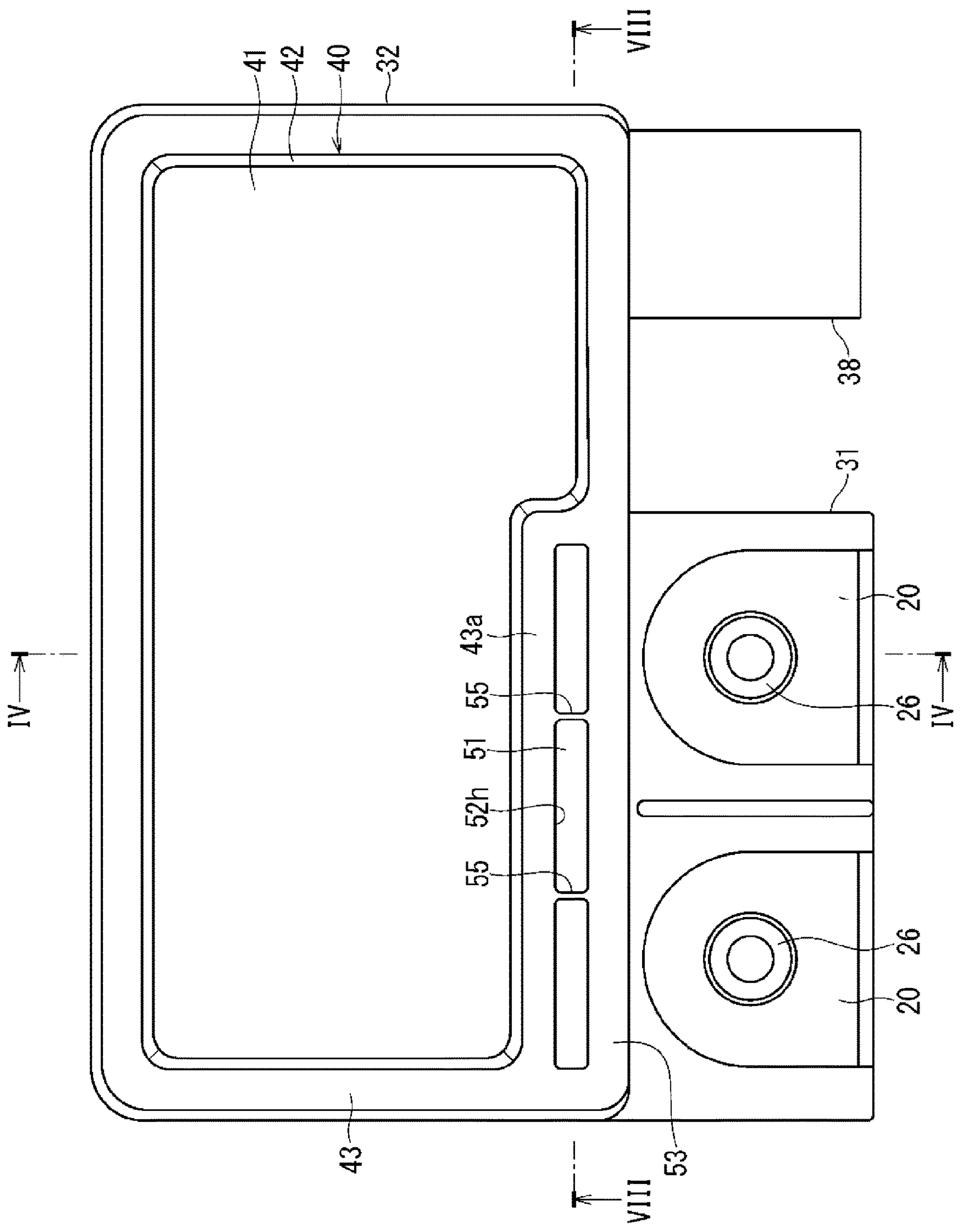
FIG. 3 is a plan view showing the electrical junction box according to Embodiment 1.
Figure 4:
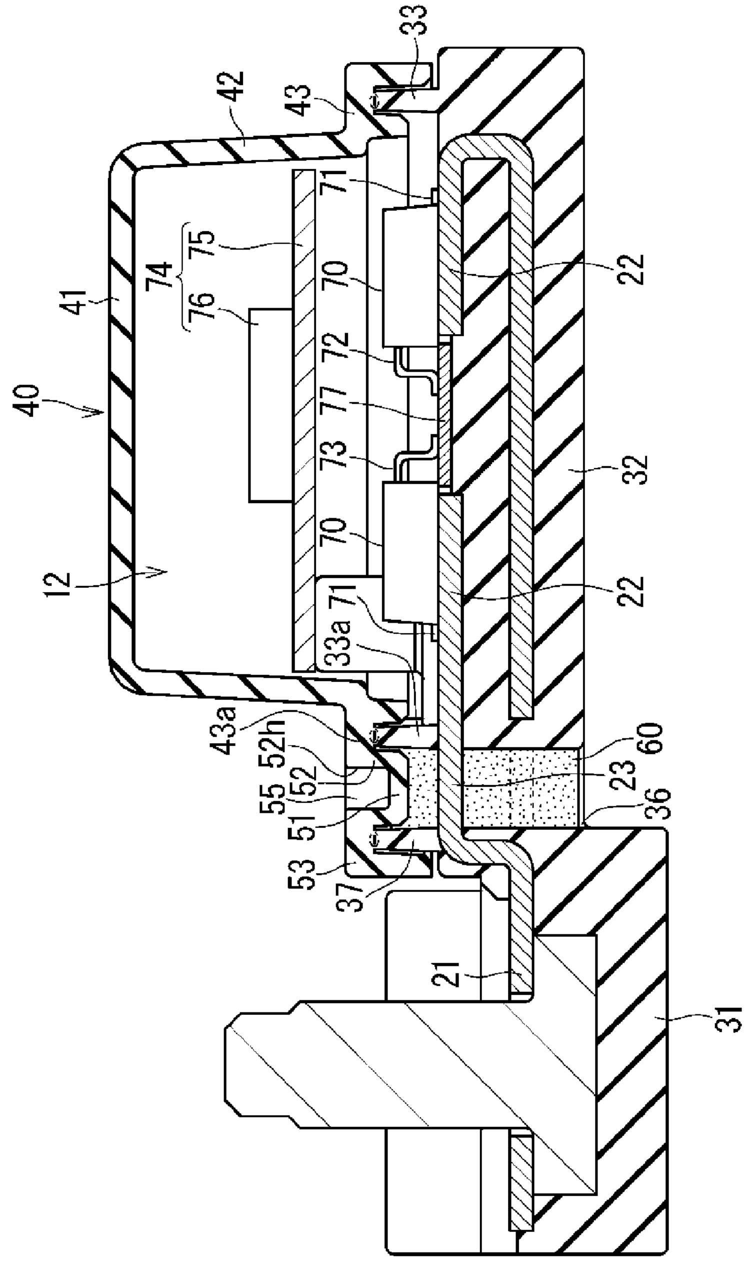
FIG. 4 is a cross-sectional view taken along line IV-IV in FIG. 3.
Figure 5:
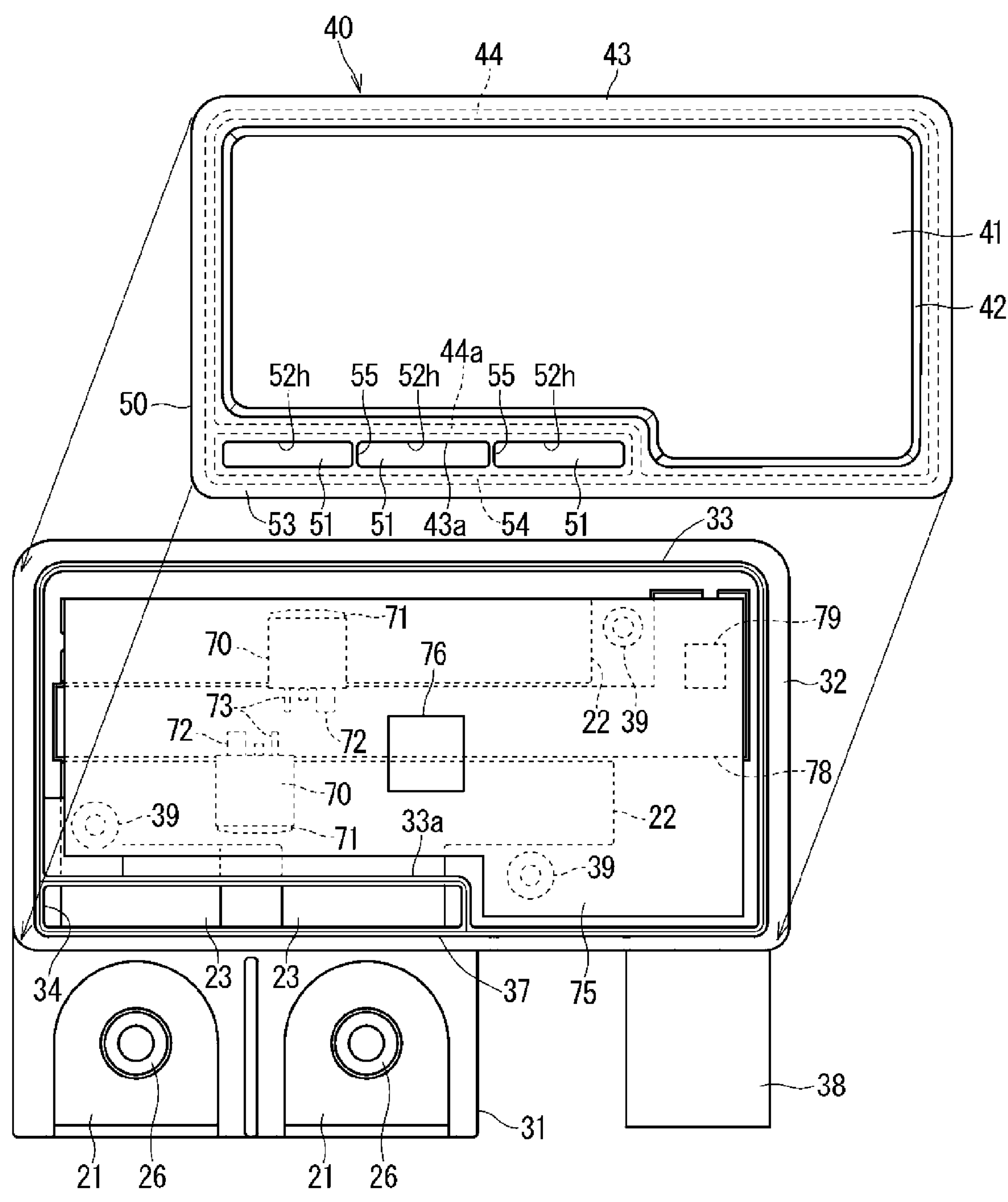
FIG. 5 is a plan view showing the electrical junction box before being covered by a case.
Figure 6:
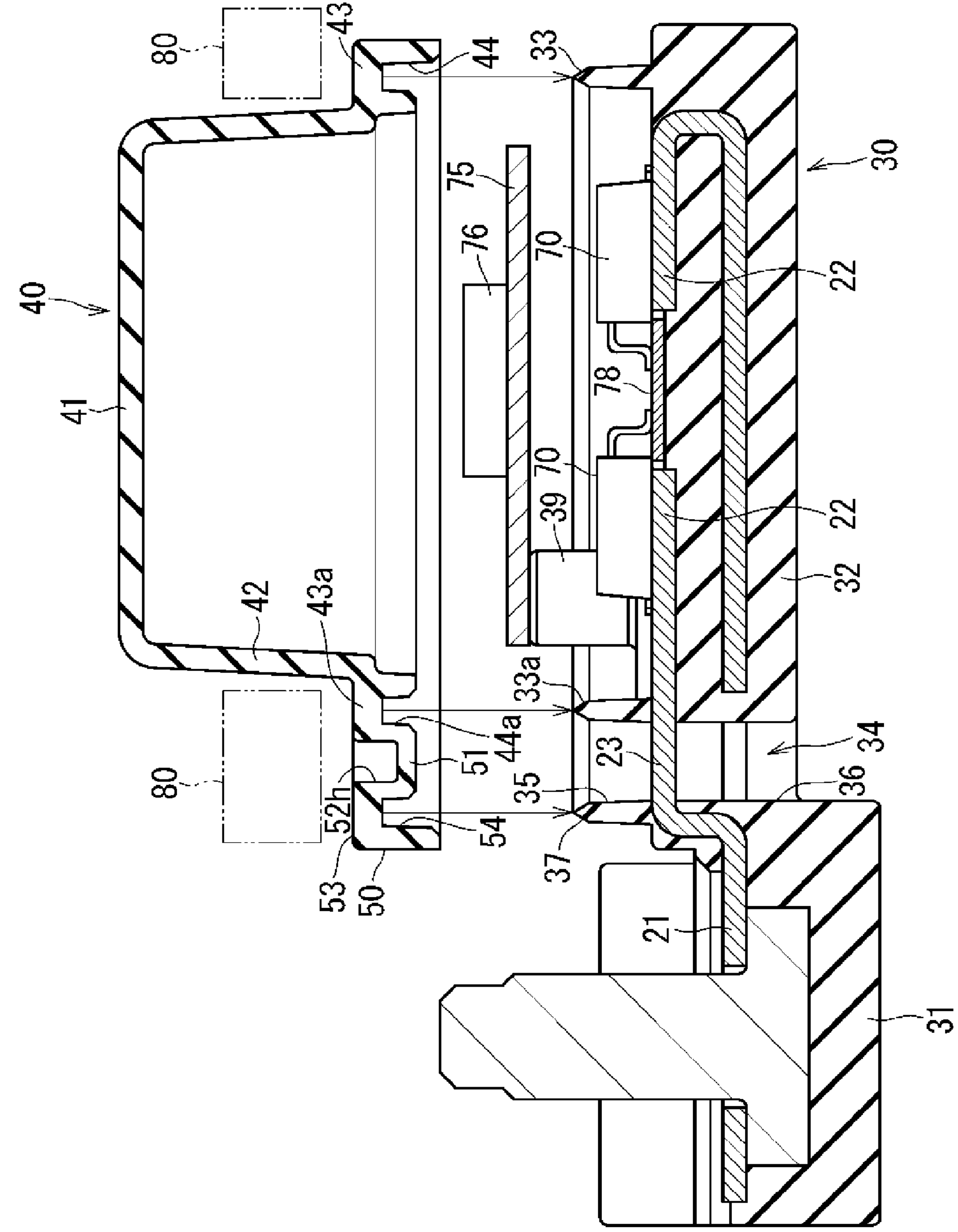
FIG. 6 is a cross-sectional view showing the electrical junction box before being covered by the case.
Figure 7:
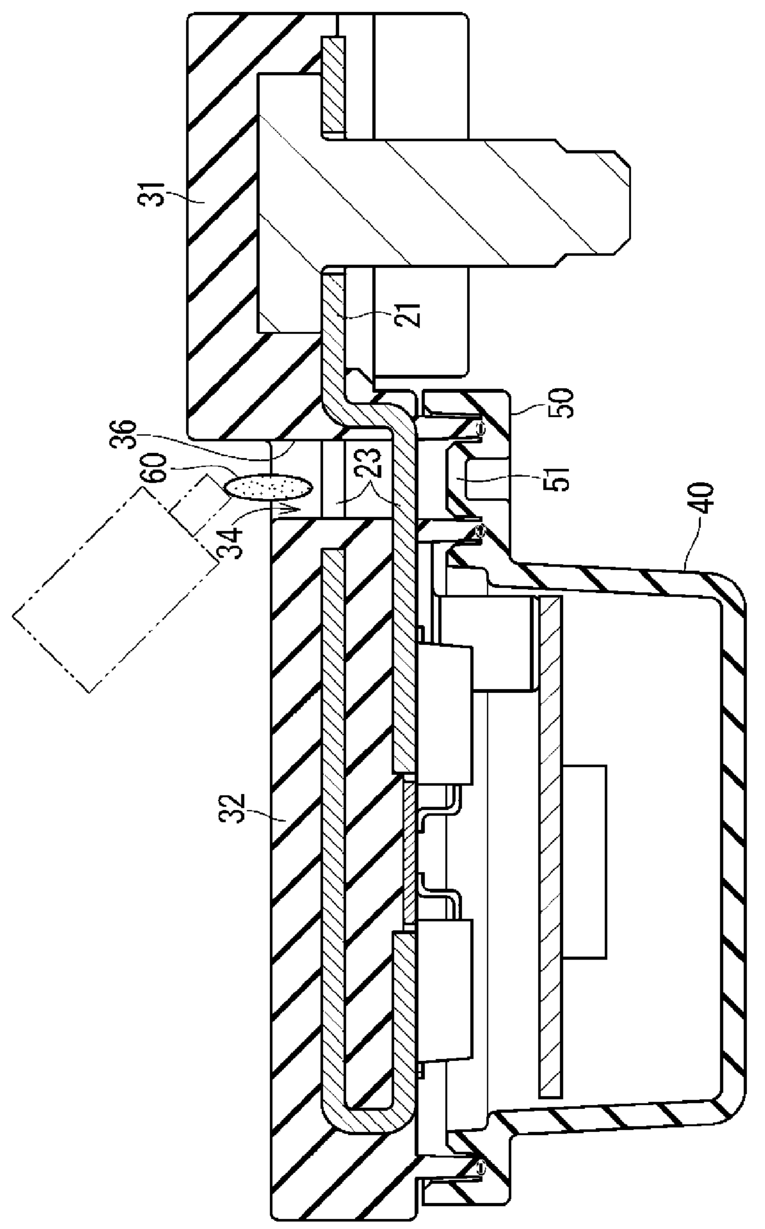
FIG. 7 is a cross-sectional view showing the electrical junction box before being filled with a waterproofing resin.
Figure 8:
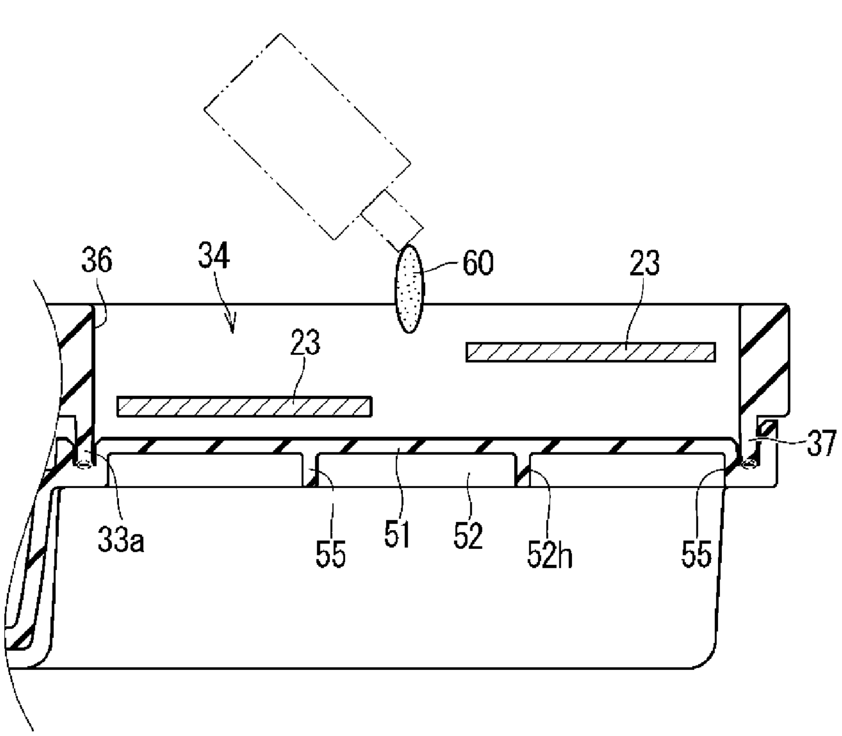
FIG. 8 is a cross-sectional view showing the electrical junction box before being filled with a waterproofing resin.

Hereinafter, an electrical junction box 10 according to Embodiment 1 will be described. FIGS. 1 and 2 are perspective views showing the electrical junction box 10 according to Embodiment 1. The perspective views shown in FIGS. 1 and 2 are viewed in different directions. FIG. 3 is a plan view showing the electrical junction box 10 according to Embodiment 1. FIG. 4 is a cross-sectional view taken along line IV-IV in FIG. 3. FIGS. 5 and 6 are respectively a plan view and a cross-sectional view showing the electrical junction box 10 before being covered by a case 40. FIGS. 7 and 8 are cross-sectional views showing the electrical junction box 10 before being filled with a waterproofing resin 60. Note that FIGS. 6 and 7 are cross-sectional views taken at a same position as FIG. 4. FIG. 8 is a cross-sectional view taken at a position along line VIII-VIII in FIG. 3.

The electrical junction box 10 includes a busbar 20, a molded resin portion 30, a case 40, a blocking portion 50, and a waterproofing resin 60. The electrical junction box 10 is provided with a bolt 26, a circuit component, and the like.

The busbar 20 forms a portion of a conductive path in a vehicle. For example, the busbar 20 forms a portion of an electric power path that connects a battery and a load such as a motor in a vehicle. The busbar 20 is made of a metal. For example, the busbar 20 is formed by pressing (bending) a metal plate. In this embodiment, two busbars 20 are provided. One of the two busbars 20 is an input busbar 20, and the other is an output busbar 20. One end portion 21 of each busbar 20 is formed so as to be connectable to an exterior circuit. In this embodiment, the one end portion 21 of the busbar 20 is provided with the bolt 26. The busbar 20 is to be electrically connected to a partner member (e.g., a terminal at an end of an electric wire) via the bolt 26. In the busbar 20, the other end portion 22 is wider than the one end portion 21. The other end portions 22 of the two busbars 20 are electrically connected to each other via an FET 70. The FET 70 is a switching element for turning on and off the conducting state between the busbars 20. The conducting state between the two busbars 20 is controlled via the FET 70.

The molded resin portion 30 is insert-molded using the busbars 20 as insert components. The molded resin portion 30 is formed by injecting a resin into a mold in the state in which the busbars 20 are set at predetermined positions relative to the mold. The molded resin portion 30 includes a first holding portion 31 and a second holding portion 32. The molded resin portion 30 is provided with a through hole 34.

The first holding portion 31 holds the one end portion 21 of each busbar 20. The one end portion 21 of one of the two busbars 20 is lined up with the one end portion 21 of the other in the left-right direction of the sheet of FIG. 5. The first holding portion 31 also holds the bolts 26. The first holding portion 31 holds the busbars 20 with the top surfaces of the busbars 20 being exposed. Note that, here, surfaces of the busbars 20 facing upward in the sheet of FIG. 4 are defined as the top surfaces. Each busbar 20 and a terminal are electrically connected to each other by screwing the terminal to the busbar 20 via the bolt 26 with the terminal being in contact with the busbar 20.

The second holding portion 32 holds the other end portion 22 of each busbar 20. The second holding portion 32 and the case 40 form a waterproof space 12 therebetween. The other end portion 22 of each busbar 20 is exposed in the waterproof space 12 from the second holding portion 32. The second holding portion 32 holds the busbars 20 with the top surfaces of the busbars 20 being exposed. The other end portion 22 of one of the two busbars 20 is lined up with the other end portion 22 of the other in the vertical direction of the sheet of FIG. 5. As shown in FIG. 4, one of the two busbars 20 is folded back at a portion that is held by the second holding portion 32. The top surface of the one busbar 20 is exposed at a position farther away from the first holding portion 31 than the top surface of the other busbar 20. The second holding portion 32 is provided with an annular first protrusion 33 at the outer edge portion. The first protrusion 33 is continuously provided so as to extend around the periphery of the waterproof space 12.

The through hole 34 is formed between the first holding portion 31 and the second holding portion 32. The through hole 34 passes through the molded resin portion 30. The molded resin portion 30 is provided with a first opening 35 and the second opening 36 of the through hole 34. The through hole 34 is formed such that the entire periphery of an intermediate portion 23 of each busbar 20 is exposed. Here, the peripheries of the intermediate portions 23 of the two busbars 20 are entirely exposed in one through hole 34. The axial direction of the through hole 34 and the direction in which the intermediate portions 23 of the busbars 20 extend intersect each other (these directions are orthogonal to each other herein). Here, the through hole 34 passes through the molded resin portion 30 in the vertical direction of the sheet of FIG. 6. The intermediate portions 23 of the busbars 20 extend in the left-right direction of the sheet of FIG. 6. The top surface of the molded resin portion 30 is provided with the first opening 35, and the bottom surface of the molded resin portion 30 is provided with the second opening 36.

The through hole 34 is formed in an elongated shape. The length of the through hole 34 in the width direction of the busbars 20 is longer than the length thereof in the direction in the busbars 20 extend. The intermediate portion 23 of each busbar 20 extends in the short-length direction of the through hole 34. The intermediate portions 23 of the two busbars 20 are lined up in the longitudinal direction of the through hole 34. The intermediate portions 23 of the two busbars 20 do not overlap each other as viewed in the axial direction of the through hole 34. The intermediate portions 23 of the two busbars 20 are apart from each other in the width direction at the position of the through hole 34. The intermediate portions 23 of the two busbars 20 are not aligned with each other in the thickness direction at the position of the through hole 34.

In the molded resin portion 30, the peripheral edge portion of the through hole 34 is provided with an annular second protrusion 37. The second protrusion 37 is continuously provided so as to extend around the periphery of the through hole 34. A portion of the first protrusion 33 is shared with the second protrusion 37. A portion of the first protrusion 33 located between the waterproof space 12 and the through hole 34 is taken as a shared protrusion 33*a*. The shared protrusion 33*a* is a portion of the first protrusion 33 surrounding the waterproof space 12 as well as a portion of the second protrusion 37 surrounding the through hole 34.

The case 40 covers the molded resin portion 30 to form the waterproof space 12. The case 40 is formed in a box shape. The case 40 includes a top plate portion 41, a side plate portion 42, and a first flange portion 43. The top plate portion 41 is provided apart from the molded resin portion 30. The side plate portion 42 protrudes from the outer edge of the top plate portion 41 toward the molded resin portion 30. The first flange portion 43 protrudes from the leading end portion of the side plate portion 42 toward the outer peripheral side. The case 40 is provided with a first groove portion 44. The first groove portion 44 is formed in the first flange portion 43.

The side plate portion 42, the first flange portion 43, and the first groove portion 44 are formed in an annular shape. The side plate portion 42, the first flange portion 43, and the first groove portion 44 are continuously provided so as to extend around the periphery of the waterproof space 12. The first protrusion 33 is fitted to the first groove portion 44. The first protrusion 33 and the first flange portion 43 are welded to each other. The outer surface on a side opposite to the bottom of the first groove portion 44 appears in the first flange portion 43. The outer surface on a side opposite to the first groove portion 44 in the first flange portion 43 is a flat surface. Accordingly, a welding machine (e.g., a horn of an ultrasonic welding apparatus) can be easily brought into contact with a portion near a welding position.

The blocking portion 50 blocks the first opening 35. The blocking portion 50 is a member that is provided separately from the molded resin portion 30. The blocking portion 50 is not provided when the molded resin portion 30 is molded. Accordingly, a portion of the molded resin portion 30 corresponding to the through hole 34 can also be molded by removing the mold in the vertical direction. With this configuration, the molded resin portion 30 can be easily molded. The blocking portion 50 includes a bottom portion 51 and a second flange portion 53.

The bottom portion 51 serves as a bottom of the through hole 34. In this embodiment, the bottom portion 51 enters the through hole 34. The blocking portion 50 is provided with a bottomed hole 52*h* on a side opposite to the bottom portion 51. With this configuration, an increase in the mass of the blocking portion 50 can be suppressed. In addition, the heat dissipation properties are improved due to an increase in the surface area of the blocking portion 50. The through hole 34 is elongated in the direction in which the busbars 20 are lined up, as viewed in the axial direction of the through hole 34. The bottomed hole 52*h* has a shape corresponding to the through hole 34, and therefore, the bottomed hole 52*h* is also elongated in the direction in which the busbars 20 are lined up.

The second flange portion 53 is a portion that laterally protrudes from the bottom portion 51. The second flange portion 53 is continuous with an inner wall 52 surrounding the bottomed hole 52*h*. The second flange portion 53 is in contact with the molded resin portion 30 at the peripheral edge portion of the through hole 34. The blocking portion 50 is fixed to the molded resin portion 30 using the second flange portion 53. The second flange portion 53 is provided with a second groove portion 54.

The second flange portion 53 and the second groove portion 54 are formed in an annular shape. The second flange portion 53 and the second groove portion 54 are continuously provided so as to extend around the periphery of the through hole 34. The second protrusion 37 is fitted to the second groove portion 54.

In this embodiment, the blocking portion 50 is formed in one piece with the case 40. The blocking portion 50 and the case 40 are formed in one piece using a mold. In the blocking portion 50 and the case 40, the first flange portion 43 and the second flange portion 53 are continuous with each other. A portion of the first flange portion 43 is shared with the second flange portion 53. A portion of the first flange portion 43 located between the waterproof space 12 and the through hole 34 is taken as a shared flange portion 43*a*. A portion of the first groove portion 44 that is formed in the shared flange portion 43*a* is taken as a shared groove portion 44*a* shared with the second groove portion 54. The shared protrusion 33*a* is fitted to the shared groove portion 44*a*.

In this embodiment, the blocking portion 50 is welded to the peripheral edge portion of the through hole 34 in the molded resin portion 30. The second protrusion 37 and the second flange portion 53 are welded to each other. The outer surface on a side opposite to the bottom of the second groove portion 54 appears in the second flange portion 53. Accordingly, a welding machine (e.g., a horn of an ultrasonic welding apparatus) can be easily brought into contact with a portion near a welding position. The outer surface on a side opposite to the second groove portion 54 in the second flange portion 53 is a flat surface.

The blocking portion 50 is provided with a rib 55. The rib 55 connects one portion and another portion of the peripheral edge portion of the bottomed hole 52*h*. The rib 55 extends in the short-length direction so as to connect one long-side portion and another long-side portion of the bottomed hole 52*h*. A plurality of ribs 55 (two ribs 55 herein) are provided at intervals in the longitudinal direction of the bottomed hole 52*h*. One bottomed hole 52*h* is divided into a plurality of small bottomed hole due to the ribs 55 being provided.

The blocking portion 50 is not provided in the second opening 36. The second opening 36 is open. The second opening 36 is used as an inlet for the waterproofing resin 60. The through hole 34 is filled with the waterproofing resin 60. The waterproofing resin 60 has insulating properties. The waterproofing resin 60 reaches the blocking portion 50 while entirely covering the peripheries of the intermediate portions 23 of the busbars 20. Water is inhibited from reaching the waterproof space 12 from the through hole 34 due to the through hole 34 being filled with the waterproofing resin 60.

More specifically, a portion of each busbar 20 between the intermediate portion 23 and the other end portion 22 extends through the inner surface of the through hole 34. A portion of the busbar 20 between the portion exposed in the waterproof space 12 and the portion exposed in the through hole 34 passes through the second holding portion 32. The busbars 20 and the molded resin portion 30 are insert-molded such that the molded resin portion 30 surrounds the peripheries of the busbars 20. However, a minute gap may be formed between the busbar 20 and the molded resin portion 30 due to an affinity between the metal material of the busbar 20 and the resin material of the molded resin portion 30, the viscosity of the resin material poured into a mold to mold the molded resin portion 30, and the like. Water splashed onto the inner surface of the through hole 34, the busbar 20, or the like may reach the waterproof space 12 from the through hole 34 through the gap. The waterproofing resin 60 inhibits the water splashed onto the inner surface of the through hole 34, the busbar 20, or the like from reaching the waterproof space 12 through the gap between the busbar 20 and the molded resin portion 30.

The waterproofing resin 60 is injected into the through hole 34 in the flowable state. Accordingly, the waterproofing resin 60 can appropriately spread along the entire periphery of each busbar 20, the inner surface of the through hole 34, and the like inside the through hole 34. The waterproofing resin 60 is cured in the state in which it appropriately spreads after injected into the through hole 34. Accordingly, the state in which the waterproofing resin 60 is injected into the through hole 34 is maintained. A manner of curing the waterproofing resin 60 is not particularly limited and can be selected as appropriate. For example, the waterproofing resin 60 may be a moisture-curable resin, an ultraviolet-curable resin, or a two-component mixture-curable resin. The waterproofing resin 60 may be a hot melt adhesive, an ordinary temperature curable silicone adhesive, a highly elastic epoxy adhesive, or the like.

A circuit component is housed in the waterproof space 12. The circuit component is not particularly limited and can be selected as appropriate. The above-mentioned FET 70 is an example of the circuit component. In the example shown in FIG. 5, a control substrate 74 and a relay substrate 77 are provided as the circuit components in addition to the FET 70.

In the example shown in FIG. 5, two FETs 70 are connected so as to face opposite sides in the current-flow direction of the two busbars 20. One of the FETs 70 is installed on one of the busbars 20, and the other FET 70 is installed on the other busbar 20. A drain terminal 71 of one of the FETs 70 is connected to one of the busbars 20, and a drain terminal 71 of the other FET 70 is connected to the other busbar 20. A source terminal 72 of one of the FETs 70 and a source terminal 72 of the other FET 70 are connected to a shared conductive portion (the relay substrate 77 herein).

The control substrate 74 includes a first circuit board 75 and a control component 76. The control component 76 is installed on the first circuit board 75. The control component 76 is connected to a gate terminal 73 via the first circuit board 75 and the relay substrate 77. The control component 76 sends on and off signals to the gate terminal 73. The control substrate 74 controls the FETs 70. In this embodiment, the control substrate 74 is provided above the busbars 20. The molded resin portion 30 is provided with supporting portions 39 that support the first circuit board 75 above the busbars 20.

The relay substrate 77 connects the source terminals 72 of the FETs 70 to each other. Also, the relay substrate 77 connects the gate terminals 73 of the FETs 70 to the control component 76 of the control substrate 74. The relay substrate 77 includes a second circuit board 78 and a relay connector 79. The second circuit board 78 is provided with a circuit pattern on which the source terminals 72 of the two FETs 70 are installed and that connects the two source terminals 72 installed thereon to each other. Also, the second circuit board 78 is provided with a circuit pattern on which the gate terminals 73 of the FETs 70 and the relay connector 79 are installed and that connects the gate terminals 73 and the relay connector 79 that are installed thereon. The first circuit board 75 of the control substrate 74 and the second circuit board 78 of the relay substrate 77 are connected to each other via the relay connector 79 and the like.

The electrical junction box 10 is provided with an external connection connector. The control substrate 74 is connected to an external control unit such as an electronic control unit (ECU) via the external connection connector. The external connection connector includes a connector terminal and a connector housing portion 38. One end portion of the connector terminal is connected to the first circuit board 75 inside the waterproof space 12. The other end portion of the connector terminal is held by the connector housing portion 38 so as to be capable of being connected to an external connector. In this embodiment, the connector housing portion 38 is formed in one piece with the molded resin portion 30. The molded resin portion 30 having the connector housing portion 38 is insert-molded using the connector terminal as an insert component.

A situation where the electrical junction box 10 according to Embodiment 1 is manufactured will be described with reference to FIGS. 5 to 8.

First, the molded resin portion 30 is insert-molded using the busbars 20 as insert components. Note that, in addition to the busbars 20, the bolts 26, the connector terminal held by the connector housing portion 38, and the like can also be used as insert components.

Next, components to be housed in the waterproof space 12 are attached to the molded resin portion 30 with the busbars 20. In this embodiment, the FETs 70, the control substrate 74, the relay substrate 77, and the like are attached thereto. For example, after the relay substrate 77 is attached, the FET 70 is installed on the other end portion 22 of each busbar 20 that is to be exposed in the waterproof space 12. In each FET 70, the drain terminal 71 is connected to the busbar 20, and the source terminal 72 and the gate terminal 73 are connected to the relay substrate 77. The control substrate 74 is attached so as to be connected to the relay substrate 77 and the connector. The first circuit board 75 of the control substrate 74 and the second circuit board 78 of the relay substrate 77 are connected to each other via the relay connector 79. The one end portion of the connector terminal in which the other end portion is exposed in the connector housing portion 38 is connected to the first circuit board 75 of the control substrate 74.

Next, as shown in FIGS. 5 and 6, the molded resin portion 30 is covered by the case 40. Then, the edge portions of the molded resin portion 30 and the case 40 are welded to each other using, for example, a welding apparatus such as an ultrasonic welding machine. The edge portion surrounding the through hole 34 is welded. The edge portion surrounding the waterproof space 12 is welded.

Next, as shown in FIGS. 7 and 8, the waterproofing resin 60 in a flowable state is poured into the through hole 34. At this time, the first opening 35 of the through hole 34 is blocked by the blocking portion 50, and therefore, the waterproofing resin 60 is likely to stay in the through hole 34. This waterproofing resin 60 is cured, and thus the electrical junction box 10 is manufactured.

Effects Etc

With the electrical junction box 10 configured as described above, a portion corresponding to the through hole 34 has a bottomed hole shape in which the second opening 36 is open and the bottom is formed by the blocking portion 50, due to the first opening 35 of the through hole 34 being blocked by the blocking portion 50. With this configuration, the waterproofing resin 60 filled in the through hole 34 through the second opening 36 in a flowable state can reliably stay in the through hole 34 until the waterproofing resin 60 is cured into a nonflowable state. Moreover, heat in the busbars 20 is transferred to the blocking portion 50 via the waterproofing resin 60 due to contact between the blocking portion 50 and the waterproofing resin 60. Thus, the heat dissipation properties of the busbars 20 are also improved.

The blocking portion 50 is formed in one piece with the case 40. With this configuration, an increase in the number of components can be suppressed compared with the case where the blocking portion 50 is provided as a member separate from the case 40.

The blocking portion 50 is welded to the peripheral edge portion of the through hole 34 in the molded resin portion 30. With this configuration, the gap between the blocking portion 50 and the molded resin portion 30 is blocked by the welded portion, thus inhibiting the waterproofing resin 60 in a flowable state from leaking through the gap between the blocking portion 50 and the molded resin portion 30. In general, regarding flowable members, a member with a low viscosity can more easily flow and enter a narrow gap and the like than a member with a high viscosity. Accordingly, it is preferable that the waterproofing resin 60 in a flowable state has a low viscosity from the viewpoint of filling the gap between the busbars 20 and the molded resin portion 30. Meanwhile, in the case where the gap between the blocking portion 50 and the molded resin portion 30 is not blocked, if the waterproofing resin 60 in a flowable state has a low viscosity, the waterproofing resin 60 may enter the gap between the blocking portion 50 and the molded resin portion 30 and leak through this gap. Even if the waterproofing resin 60 in a flowable state has a low viscosity, the waterproofing resin 60 will be inhibited from leaking through the gap between the blocking portion 50 and the molded resin portion 30, due to the blocking portion 50 being welded to the peripheral edge portion of the through hole 34 in the molded resin portion 30.

In this embodiment, when the molded resin portion 30 and the case 40 are welded to each other (i.e., the waterproof space is formed), the molded resin portion 30 and the blocking portion 50 are also welded to each other (i.e., the through hole 34 and the bottom portion 51 are sealed) at the same time. With this configuration, an increase in the work quantity caused by addition of a step of sealing the through hole 34 and the bottom portion 51 can be suppressed.

The blocking portion 50 is provided with the annular second groove portion 54, and the peripheral edge portion of the through hole 34 in the molded resin portion 30 is provided with the second protrusion 37 fitted to the second groove portion 54. With this configuration, the waterproofing resin 60 in a flowable state is unlikely to leak to the outside even when entering the gap between the blocking portion 50 and the molded resin portion 30.

The bottom portion 51 of the blocking portion 50 that serves as a bottom of the through hole 34 enters the through hole 34. With this configuration, the amount of usage of the waterproofing resin 60 can be reduced. Moreover, the distance between the blocking portion 50 to each busbar 20 is reduced, thus making it likely that heat in the busbar 20 reaches the blocking portion 50.

Supplementary Note

Figure 9:
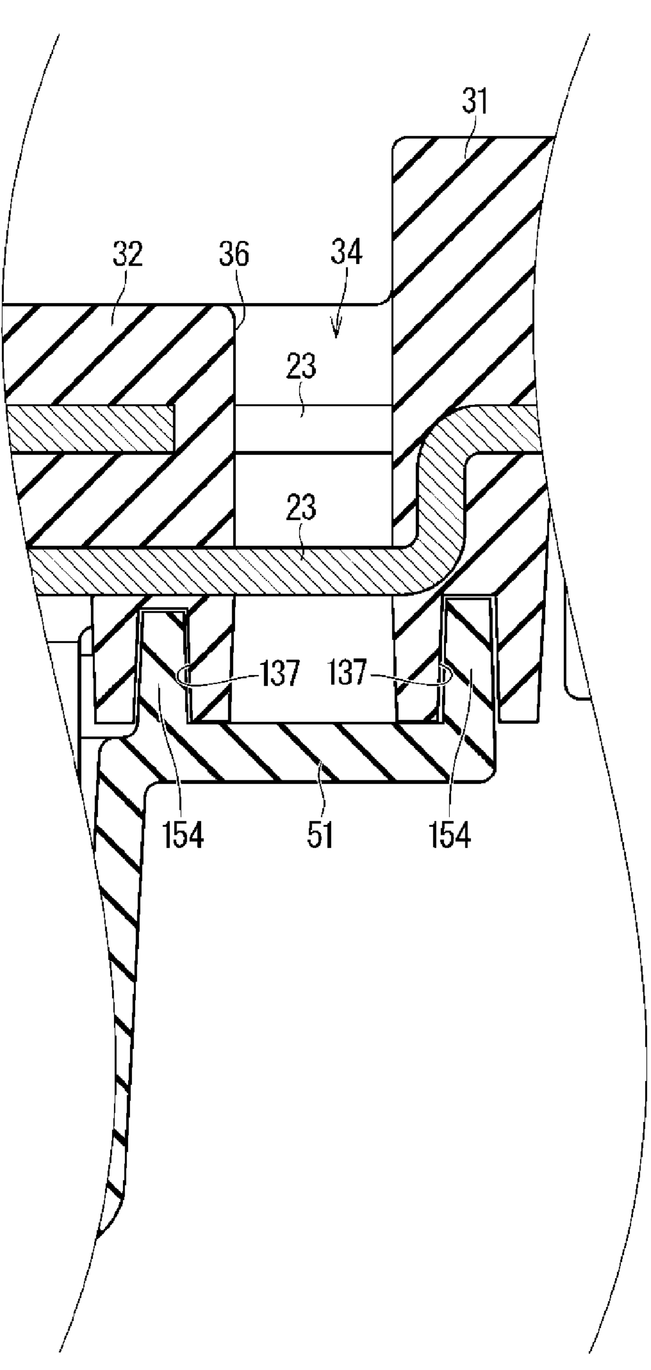
FIG. 9 is a cross-sectional view showing a modified example of the electrical junction box.

FIG. 9 is a cross-sectional view showing a modified example of the electrical junction box 10.

In the descriptions above, the blocking portion 50 is provided with the second groove portion 54 and the molded resin portion 30 is provided with the second protrusion 37, but this is not an essential configuration. For example, the second groove portion 54 and the second protrusion 37 need not be provided. Also, as in the example shown in FIG. 9, for example, a configuration may be employed in which the peripheral edge portion of the through hole 34 in the molded resin portion 30 is provided with an annular groove portion 137 and the blocking portion 50 is provided with an annular protrusion 154 fitted to the groove portion 137. It is sufficient that one of the blocking portion 50 and the peripheral edge portion of the through hole 34 in the molded resin portion 30 is provided with an annular groove and the other is provided with an annular protrusion fitted to the groove.

Moreover, in the descriptions above, a portion of the blocking portion 50 that serves as a bottom of the through hole 34 enters the through hole 34, but this is not an essential configuration. As in the example shown in FIG. 9, a portion of the blocking portion 50 that serves as a bottom of the through hole 34 need not enter the through hole 34.

Moreover, in the descriptions above, the blocking portion 50 and the molded resin portion 30 are welded to each other, but this is not an essential configuration. The blocking portion 50 and the molded resin portion 30 need not be welded to each other. In this case, even if the waterproofing resin 60 in a flowable state has a low viscosity, the waterproofing resin 60 in a flowable state is inhibited from leaking through a gap between the blocking portion 50 and the molded resin portion 30 by, for example, increasing the height of a portion where the protrusion and the groove are fitted to each other.

In addition, in the descriptions above, the blocking portion 50 is formed in one piece with the case 40, but this is not an essential configuration. The blocking portion 50 may be provided as a member separate from the case 40. The blocking portion 50 may block an opening of the through hole 34 on a side opposite to the side on which the case 40 covers. In this case, the opening that is covered by the blocking portion 50 is taken as the first opening 35.

Note that the configurations described in the above-described embodiments and modified examples can be used together as appropriate as long as they are compatible with each other.

The invention claimed is:

1. An electrical junction box comprising:

a busbar;

a molded resin portion that is insert-molded using the busbar as an insert component, the molded resin portion having a first holding portion, a second holding portion and a through hole extending through the molded resin portion so as to define a first opening and a second opening, wherein the through hole is disposed between the first holding portion and the second holding portion;

a case that covers the second holding portion of the molded resin portion to form a waterproof space;

a blocking portion formed integral to the case and is configured to be inserted into the first opening of the through hole so as to block the first opening; and a waterproofing resin that fills in the second opening of the through hole and abuts against the blocking portion, wherein the waterproofing resin is closed by the blocking portion at the first opening and is exposed at the second opening, wherein the first holding portion holds one end portion of the busbar, and the second holding portion holds the busbar with the other end portion of the busbar being exposed in the waterproof space, an entire periphery of an intermediate portion of the busbar is exposed in the through hole and encased by the waterproofing resin, the blocking portion is a member that is provided separately from the molded resin portion, and the waterproofing resin reaches the blocking portion while entirely covering the periphery of the intermediate portion of the busbar.

2. The electrical junction box according to claim 1, wherein the blocking portion is welded to a peripheral edge portion of the through hole in the molded resin portion.

3. The electrical junction box according to claim 1, wherein one of the blocking portion and a peripheral edge portion of the through hole in the molded resin portion is provided with an annular groove and the other is provided with an annular protrusion fitted to the groove.

4. The electrical junction box according to claim 1, wherein a portion of the blocking portion that serves as a bottom of the through hole enters the through hole.

5. The electrical junction box according to claim 2, wherein one of the blocking portion and a peripheral edge portion of the through hole in the molded resin portion is provided with an annular groove and the other is provided with an annular protrusion fitted to the groove.

6. The electrical junction box according to claim 2, wherein a portion of the blocking portion that serves as a bottom of the through hole enters the through hole.

7. The electrical junction box according to claim 3, wherein a portion of the blocking portion that serves as a bottom of the through hole enters the through hole.

8. An electrical junction box comprising: a busbar; a molded resin portion that is insert-molded using the busbar as an insert component; a case that covers the molded resin portion to form a waterproof space; a blocking portion formed integral to the case and blocks a first opening out of a first opening and a second opening of a through hole passing through the molded resin portion; and a waterproofing resin that is filled in the through hole, wherein the molded resin portion includes a first holding portion that holds one end portion of the busbar, and a second holding portion that holds the busbar with the other end portion of the busbar being exposed in the waterproof space, the through hole is formed between the first holding portion and the second holding portion and an entire periphery of an intermediate portion of the busbar is exposed in the through hole, the blocking portion is a member that is provided separately from the molded resin portion, and the waterproofing resin reaches the blocking portion while entirely covering the periphery of the intermediate portion of the busbar, wherein the blocking portion includes a bottom portion configured to be seated within the first opening so as to close the first opening.

* * * * *